United States Patent Office 2,803,546
Patented Aug. 20, 1957

2,803,546
ALCOHOLIC BEVERAGE AND METHOD OF PREPARING SAME

Donald E. Bergmann and Fred A. Wilcox, Chicago, Albert P. Van der Kloot, Skokie, and Robert I. Tenney, Winnetka, Ill.

No Drawing. Application September 6, 1955, Serial No. 532,738

11 Claims. (Cl. 99—31)

Our invention relates to alcoholic beverages generally comparable to those known as cocktails or highballs, such beverages as now known being "mixed drinks" comprising a distilled liquor in admixture with certain diluents and flavoring agents such as fruit juices, water, flavor concentrates, etc. For example, a "Cuba Libra" normally consists of rum, carbonated cola beverage and lime juice; a "Tom Collins" usually consists of gin, soda water, lemon juice and sugar, etc. Such beverages are, of course, subject to unlimited variation in proportions as well as in ingredients, depending on the skill and ingenuity of the individual preparing the drink.

There are on the market bottled mixtures for such prepared drinks which are ready for consumption without the necessity for mixing and preparing such drinks immediately prior to consumption. However, such prepared drinks are not well accepted by the epicure.

We have devised a beverage and method of preparing the same, our product avoiding the objections usually applied to such ready-prepared drinks, and we consider it an acceptable substitute for the mixed drink as usually prepared just prior to consumption and in some ways preferable thereto. According to our invention, a beverage is produced by the "natural" processes of brewing and fermentation and without distillation, thus avoiding certain of the undesirable by-products inherent in distilled liquors, such as fusel oil. A beverage may be produced, according to our invention, having all the flavor and character of substantially any known mixed drink, but lacking certain undesirable features, as noted above.

Briefly outlined, our invention contemplates a process embodying a number of steps, each being capable of numerous variations according to the specific end flavor and character desired. These steps, in general outline, are as follows:

Brewing

A grain mash is prepared in a manner similar to that employed for mashing beer and ale, but differing therefrom in that our objectives are for maximum sugar production, minimum protein solution and minimum color development. For example, a mash which we consider suitable may consist of from 5% to 60% malt and 95% to 40% cornstarch, the mash being handled as a typical distiller's mash, except that the grains will be separated before fermentation.

Conversion temperatures are preferably between about 55° C. and 75° C., the optimum temperature to complete the conversion being about 70° C. The alcohol content desired in the end product will govern the specific gravity of the wort produced; a desirable specific gravity will lie within the range of about 14% to 20% Plato (Balling).

The wort is separated from the grains by lautering, filtering or centrifuging, or a combination of any of these procedures, and is boiled as in beer production. A decolorizing grade of activated carbon is preferably added to the wort in the kettle during the boiling operation and remains in contact with the liquid for at least ten minutes, in order to remove as much color as possible. Those skilled in the art will readily understand that the amount of carbon employed will depend on the type and grade of the carbon and time of contact thereof with the wort. We have found that thirty minutes' contact with from 0.2 to 1.0 pound per barretl of Nuchar C-190 (Industrial Chemical Sales Division, West Virginia Paper & Pulp Company) gives satisfactory results.

While the wort is boiling a flavoring agent is introduced, such as juniper berries, if a gin-flavored beverage such as a "Tom Collins" is desired. A flavoring extract may, of course, be substituted for the natural flavoring agent. It will be readily understood that a wide variety of other flavors may likewise be used, either in the natural or in the extract form, such as hops, cola, coffee, cinchona bark, mint and numerous others. Birch, spruce and sassafras are also among the preferred flavors.

The pH value of the wort is adjusted in the boiling vessel, and at any time prior to the fermentation step hereinafter described, to a value between about 4.8 and 5.2 by the addition of an acid compatible with the end flavor, such as citric, lactic or phosphoric. Since a further objective of our procedure is to add ammonium ion, these acids may be added in the form of their ammonium salts.

After the wort has boiled sufficiently to achieve the desired extraction of flavor and the required specific gravity, it is filtered and cooled to a temperature best suited to the particular yeast or other fermenting organism to be employed. We find about 20° C. quite satisfactory for *Saccharomyces ellipsoides* which we have employed. The optimum fermentation temperatures of the various organisms mentioned below are well known in the art. Fermentation in most cases will be expedited by the use of diatomaceous earth or like coagulating aids while the wort is hot.

Fermentation

The cooled wort is fermented in either open or closed vessels using isolates of organisms capable of lending either no flavor or a flavor compatible to the end product. For the production of a Tom Collins type of beverage, we have used one or more of the following organisms with satisfactory results:

| Organism | Strain |
|---|---|
| Saccharomyces carlsbergensis | Strain H 198 in Wahl-Henius Institute Collection or NRRL Y 236. |
| Saccharomyces carlsbergensis | American Type Culture. |
| Saccharomyces ellipsoideus | Strain H 164, W-H I ATC 4123. |
| Saccharomyces ellipsoideus | Strain H 175, W-H I ATC 4108. |
| Schizo saccharomyces pombe | W-H I H 166 NRRL Y 164. |
| Saccharomyces cereviseae, Rasse XII | W-H I Collection 112 ATC 561. |
| Saccharomyces ellipsoideus, Jaurez No. 7 | W-H I 165. |

We have found that for the optimum results contemplated by our invention it is highly desirable to provide in the wort a minimum of 50 parts per million of a salt of one of the acids of the Krebs cycle, such as malic, maleic, fumaric or succinic, and from 100 to 200 parts per million of ammonium ion, preferably in the form of a phosphate, fumarate or sulphate. We have found that the inclusion of these substances lends a blandness to the flavor, which is highly desirable and results in the formation of fewer undesirable fermentation by-products which might deleteriously affect the flavor. For example, we have reduced the formation of amyl alcohol in such a fermentation to below 5 parts per million by the inclusion of 100 parts per million of ammonium phosphate and 50 parts per million of ammonium fumarate.

We have also found that it is highly desirable to provide active enzymes during the fermentation stage, which enzymes must be capable of further degrading the dextrins formed by the malt amylases into fermentable sugars to enable the depletion of these extract-yielding substances in those cases where a specific gravity corresponding to a value below 0.5% Balling is desired. We have found that the fraction of the media in which *Aspergillus oryzae* has grown, which is precipitated by 50% alcohol, contains an enzyme system capable of degrading even the so-called limit dextrins of malt diastase action. This is our preferred enzyme preparation for this purpose, although others possessing limited dextrinase activity would be equally applicable.

In other respects, the fermentation is conducted in a fashion familiar to any brewer, except for the relatively higher temperatures. When fermentation is completed, the resulting beer is decanted and further separated from the yeast, as by filtration.

Cellar treatment

The liquid so obtained, which we may here refer to as a beer and possessing the particular flavor desired in the end product, such as juniper in the case of a "Tom Collins," is acidified to a pH value between about 2.8 and 3.0 by the addition of citric acid. A sweetening agent may also be added to impart a final flavor adjustment, and carbonation may then be applied in the usual way when the final product is to be a carbonated drink.

It is, of course, possible during the preceding steps to produce an unflavored and substantially uncolored beer base. This eliminates the kettle extraction of botanicals. Such a neutral base may then be flavored in a more flexible production pattern by the addition of botanical extracts in the cellar. Either method, with ordinary clarification and filtration processes, produces a beverage ready for bottling.

Pasteurization

The beverage produced as described above should be pasteurized in order to inhibit further organic growth. The products are accordingly held at temperatures within the approximate range of from about 130° to 150° F. for sufficient time to introduce at least 8 pasteurization units, such a unit being defined as 1 minute at 140° F., and is calculated for any other temperature by the equation as defined by Alstrand and Scruggs, American Society for Brewing Chemists Proceedings (1952), pages 53–60:

$$P.U. = \frac{f_h}{(f_h/U)} Fi$$

where:

$f_h$ = slope of the heating curve $$Fi = \log^{-1}\left(\frac{140-PT}{12.5}\right) \quad (PT = \text{pasteurizer holding section temperature})$$

$\frac{f_h}{U}$ = a factor related to "$g$" after Ball (Ball, C. O., Thermal process time for canned food. Bul. Nat. Res. Council 7, part 1, No. 37, 1923. Ball, C. O., Mathematical solution of problems on thermal processing of canned food. Univ. of Calif. Pub. in Pub. Health 1, No. 2, 15, 1928)

where:

$$g = \log^{-1}\left[\log jI - \frac{B_B}{f_h}\right]$$

$jI$ = the number of degrees below PT where the extended straight line crosses the axis of ordinates under the conditions of the test.

$I = PT - IT$ ($IT$ = initial temperature of the beer)

$B_B$ = pasteurizing from start of preheat to end of hold section.

As further stated in said Alstrand and Scruggs paper:

"If the temperatures in the sections of the pasteurizer are such that a straight line cannot be drawn through the points plotted on semi-log paper, the graphical method of Bigelow [1] must be resorted to in order to determine the P. U. value."

Various changes coming within the scope of our invention may suggest themselves to those skilled in the art, and hence we do not wish to be restricted to the specific embodiments described herein, except to the extent indicated in the appended claims.

We claim:

1. A method of producing an alcoholic malt beverage, comprising preparing a grain mash in a manner substantially as employed for mashing beer and ale and of a composition designed for maximum sugar production, minimum protein solution and minimum color development, separating the wort, boiling the wort with addition of flavoring material, acidifying the wort by addition of a member of the group consisting of citric, lactic and phosphoric acids and their ammonium salts, cooling the wort to a fermentation temperature, reducing formation of fermentation by-products of undesirable flavor by addition of a member of the group consisting of malic, maleic, fumaric and succinic acids together with an ammonium salt of a member of the group consisting of phosphoric, fumaric and sulphuric acids, adding a limit dextrinase capable of degrading dextrins present into fermentable sugars, fermenting, and separating the fermented liquid.

2. A process as defined in claim 1, wherein at least 100 parts per million of ammonium ion are included in the fermentation batch.

3. A process as defined in claim 2, wherein the fermented liquid is acidified and pasteurized.

4. A process as in claim 1 wherein prior to fermentation the acidity of the wort is adjusted to a pH value of not substantially higher than 5.2.

5. A process as in claim 1 wherein the salt added prior to fermentation is in quantity to acidify to within the approximate range of pH 4.8–5.2.

6. A method of producing an alcoholic malt beverage, comprising preparing a grain mash of a composition designed for maximum sugar production, minimum protein solution and minimum color development, the mash temperature being maintained within the approximate range of 55°–70° C., separating the wort when the wort has attained a specific gravity of about 12% to 18% Plato, boiling said wort with a flavoring agent, said boiling being continued until a specific gravity of about 14% to 20% Plato has been attained, adjusting the pH thereof to within an approximate range of 4.8 to 5.2, separating the boiled wort and cooling it to a temperature compatible with the fermenting organism to be employed, adding to the wort at least about 50 parts per million of a salt of an acid of the Krebs cycle and including at least 100 parts per million of ammonium ion, fermenting the wort by means of an organism incapable of yielding a flavor incompatible with the final product, also including in the fermentation wort an enzyme capable of further degrading the dextrins present into fermentable sugars, separating the fermented liquid, acidifying the same to approximately pH 2.8 to 3.8, and pasteurizing.

7. A method as defined in claim 6, wherein the wort during fermentation contains appreciable quantities of ammonium phosphate and ammonium fumarate.

8. In the method of producing a malt type alcoholic beverage of the class described, adding, prior to the fermentation step, a limit dextrinase capable of degrading dextrins present into fermentable sugars in the presence of at least 50 parts per million of an acid which is a member of the group consisting of malic, maleic, fumaric and succinic.

---

[1] Bigelow, W. D., Bohart, G. S., Richardson, A. C., and Ball, C. O., Heat penetration in processing canned foods. National Canners Association Bulletin 16L, 1920.

9. A method of producing an alcoholic malt type beverage comprising the preparation of a grain mash, separation of the wort, boiling the wort, fermenting the wort with addition of yeast in the presence of at least 50 parts per million of a member of the group consisting of malic, maleic, fumaric and succinic acids and at least 100 parts per million of an ammonium salt of a member of the group consisting of phosphoric, fumaric and sulphuric acids, adding a limit dextrinase capable of degrading dextrins present into fermentable sugars, fermenting, and separating the fermented liquid, then adding flavoring extractives.

10. A method as defined in claim 6 wherein the pasteurizing step consists in introducing at least 8 pasteurization units.

11. A method as defined in claim 9 wherein the product is pasteurized with the introduction of at least 8 pasteurization units.

References Cited in the file of this patent

UNITED STATES PATENTS

| | | |
|---|---|---|
| 805,607 | Weyermann | Nov. 28, 1905 |
| 1,000,596 | Gilg et al. | Aug. 15, 1911 |
| 1,164,193 | Kaiser et al. | Dec. 14, 1915 |
| 2,206,719 | Draeger | July 2, 1940 |
| 2,223,520 | Ioannu | Dec. 3, 1940 |
| 2,665,213 | Hayakawa | Jan. 5, 1954 |